United States Patent [19]

Hayakawa et al.

[11] Patent Number: 4,966,264

[45] Date of Patent: Oct. 30, 1990

[54] THRUST WASHER MOUNTING APPARATUS

[75] Inventors: Youichi Hayakawa, Toyoake; Chihiro Hosono, Anjo; Masaaki Nishida, Anjo; Kozo Kato, Anjo, all of Japan

[73] Assignee: Aisin Aw Co., Ltd., Anjo, Japan

[21] Appl. No.: 293,249

[22] Filed: Jan. 4, 1989

[30] Foreign Application Priority Data

Aug. 11, 1988 [JP] Japan .................................. 63-201401

[51] Int. Cl.[5] ............................................. F16D 11/00
[52] U.S. Cl. .................... 192/3.34; 475/311; 475/102; 192/4 A; 192/109 R; 192/110 B; 384/427
[58] Field of Search ................... 192/3.34, 12 B, 48.92, 192/109 R, 110 B, 4 A; 74/782, 781 R, 767; 384/420, 424, 427; 475/311, 102, 107, 288

[56] References Cited

U.S. PATENT DOCUMENTS

| | | | |
|---|---|---|---|
| 2,810,464 | 10/1957 | Geibel | 192/109 R |
| 3,209,620 | 10/1965 | Moan | 192/12 B |
| 4,387,607 | 6/1983 | Sakakibara | 74/781 R |
| 4,484,494 | 11/1984 | Sakakibara | 74/781 R |
| 4,676,123 | 6/1987 | Kubo et al. | 192/4 A |
| 4,711,138 | 12/1987 | Miura et al. | 74/767 |
| 4,750,384 | 6/1988 | Belliveau | 74/781 R |

FOREIGN PATENT DOCUMENTS

| | | | |
|---|---|---|---|
| 3424227 | 1/1986 | Fed. Rep. of Germany | 192/109 R |
| 914277 | 1/1963 | United Kingdom | 192/109 R |

Primary Examiner—Rodney H. Bonck
Assistant Examiner—Andrea Pitts
Attorney, Agent, or Firm—Kanesaka and Takeuchi

[57] ABSTRACT

A thrust washer has a protrusion which is formed with a projecting pawl. The rotating member is formed with a through hole, into which the protrusion of the thrust washer is inserted, such that the pawl is projected out on the opposed surface remote from the thrust washer of the rotating member, whereby the upstanding surface of the pawl is used as a stop means. Thus, the thrust washer is positively secured to the rotating member.

4 Claims, 5 Drawing Sheets (a)

| | | FIRST AUTOMATIC TRANSMISSION MECHANISM 11 | | | | | | | SECOND AUTOMATIC TRANSMISSION MECHANISM 27 | | |
|---|---|---|---|---|---|---|---|---|---|---|---|
| | | C1 | C2 | B1 | B2 | B3 | F1 | F2 | C3 | B4 | F3 |
| | P | | | | | | | | | ○ | |
| | R | | ○ | | | ○ | | | | ○ | |
| | N | | | | | | | | | ○ | |
| D | 1 | ○ | | | | | | ○ | | ○ | ○ |
| D | 2 | ○ | | (○) | ○ | | ○ | | | ○ | ○ |
| D | 3 | ○ | | (○) | ○ | | ○ | | ○ | | |
| D | 4 | ○ | ○ | | ○ | | | | ○ | | |
| 3 | 1 | ○ | | | | | | ○ | | ○ | ○ |
| 3 | 2 | ○ | | ○ | ○ | | ○ | | | ○ | ○ |
| 3 | 3 | ○ | | ○ | ○ | | ○ | | ○ | | |
| 2 | 1 | ○ | | | | | | ○ | | ○ | ○ |
| 2 | 2 | ○ | | ○ | ○ | | ○ | | | ○ | ○ |
| 1 | 1 | ○ | | | | ○ | | ○ | | ○ | ○ |
| 1 | 2 | ○ | | ○ | ○ | | ○ | | | ○ | ○ |

THRUST WASHER MOUNTING APPARATUS

BACKGROUND OF THE INVENTION

1. Field of the Invention

The present invention relates to a thrust washer interposed between relatively rotating members in an automatic transmission, specifically a mounting apparatus of the thrust washer.

2. Description of the Prior Art

Generally, in the automatic transmission, a lot of members must be housed in a limited space due to the limited mounting space. However, it is difficult to axially position rotating members so as not to contact each other. Therefore, the rotating members are positioned in each unit by axially tightly placing the rotating members in series with thrust washers or thrust bearings therebetween.

Conventionally, the thrust washer has a protrusion axially projected on the outer peripheral section, while the rotating member has a through hole, so that the protrusion is inserted into the through hole for mounting.

The thrust washer is secured only with friction forces between the protrusion and the through hole. Accordingly, upon assembling the automatic transmission, the thrust washer is often dropped, or the protrusion and the through hole are often placed in misalignment. Further, when mounting the thrust washer, enough care must be taken with respect to dropping and misalignment using grease, which is difficult to do. In particular, when using a washer and the like, if waves are formed in the washer, the protrusion is often prevented from fitting enough into the through hole. In addition, in the automatic transmission assembled, a clearance is often produced between the thrust washer and the rotating member rotating relatively to the thrust washer, which also causes the dropping and the misalignment of the thrust washer.

SUMMARY OF THE INVENTION

The object of the preswent invention is to provide a thrust washer mounting apparatus for an automatic transmission in which a thrust washer is positively secured with a pawl, thereby overcoming the problems.

Now the present invention is explained with reference to FIG. 1 and FIG. 2.

In an automatic transmission in which a plurality of rotating members (1), (2) rotating in different directions are interposed adjacent to each other, and a thrust washer (3) is mounted to at least one of the adjacent rotating members, the thrust washer (3) has a certain number of protrusions (3a), each of which is formed with a projecting pawl (3b) having a front tapered surface (a) and a rear upstanding surface (b), and the rotating members (1) are formed with a certain number of through holes (1a), into which the protrusion (3a) of the thrust washer (3) is inserted, such that the pawl (3a) is projected out of the opposed surface remote from the thrust washer (3) of the rotating member (1), whereby the upstanding surface (b) is used as a stop means.

In the structure as mentioned above, the thrust washer (3) is pressed with the protrusion (3a) in alignment with the through hole (1a) of the rotating member (1) to be mounted to the rotating member (1).

The thrust washer (3) has a pawl (3b) which is bent when its tapered surface (a) comes into contact with the through hole (1a) on its outer peripheral surface, and is released from bending when the pawl (3b) is projected out from the through hole (1a). As this time, the upstanding surface (b) is engaged with the opposing side surface of the rotating member (1), so that it is positively prevented from being withdrawn. In this state, when, assembling the automatic transmission, the rotating member (1) is prevented from dropping and misalignment in any posture in assembly. Further, when driving the automatic transmission, the rotating member (1) is rotated relatively to adjacent rotating member (2), but this relative rotation is absorbed by the sliding of the thrust washer (3), and the rotating member (1) is kept on the certain axial position. In addition, even if a clearance is produced between the thrust washer (3) and the adjacent rotating member (2), the thrust washer (3) held by the pawl (3b) is prevented from dropping and misalignment.

Incidentally the reference numerals in the parentheses are used only for reference with the drawings and do not limit the structure of the invention. The same number may be used differently in the following description relative to the previous description in which the broader concept are adopted.

BRIEF DESCRIPTION OF THE DRAWINGS

FIG. 4 is an illustration showing the operation of the automatic transmission of FIG. 3.

DETAILED DESCRIPTION OF THE PREFERRED EMBODIMENTS

An embodiment of the present invention will now be described with reference of the drawings.

Figure 3:
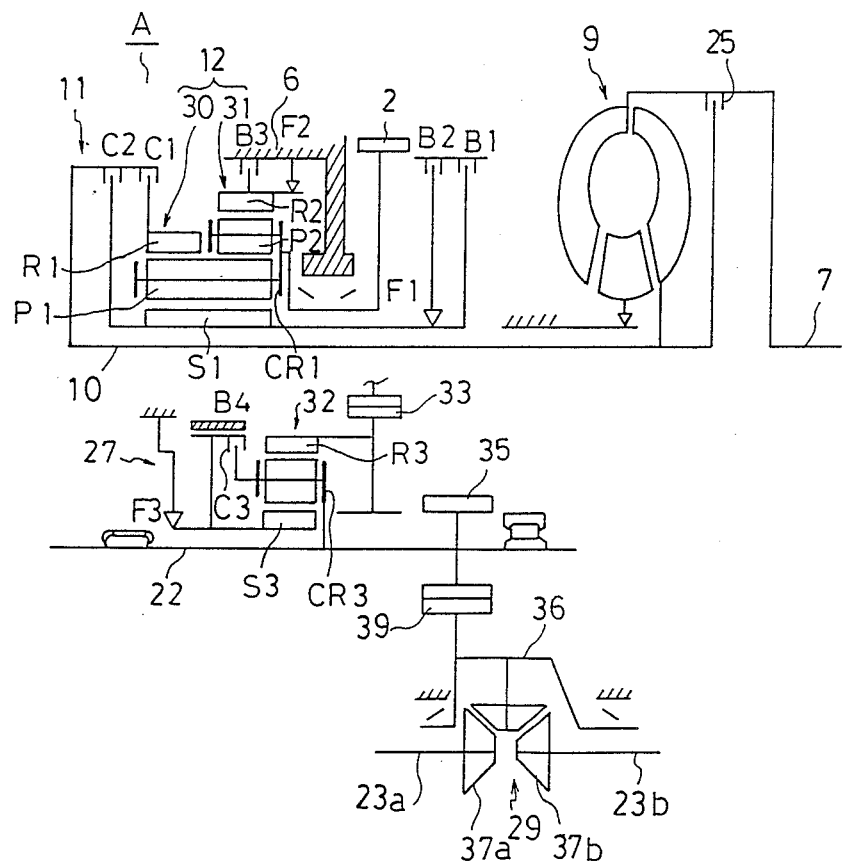
FIG. 3 is a schematic view of an automatic transmission to which the present invention is applied.

Now referring to FIG. 3, an automatic transmission applicable to the present invention comprises three shafts, that is an input shaft 10 aligned with an engine crank shaft 7, a counter shaft 22, and a front axle shaft 23a, 23b. A first automatic transmission mechanism section 11 and a torque converter 9 with a lockup clutch 25 are supported on the input shaft 10, and a second automatic transmission mechanism section 27 is supported on the counter shaft 22. A front differential device 29 is supported on the front axle shafts 23a, 23b.

The first automatic transmission mechanism section 11 comprises a planetary gear unit 2 assembled from a single planetary gear 30 and a dual planetary gear 31. In the planetary gear unit 2, the common sun gear S1 of the two planetary gears and the common carrier CR1 are integrally linked, and in addition, a long pinion P1 is engaged with the sun gear S1. The input shaft 10 and a ring gear R1 of the single planetary gear 30 are linked through a first (forward) clutch C1, and the input shaft 10 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 2 which is supported on the casing bulkhead. The gear 2 is an output member of the automatic transmission mechanism section 11. The second automatic transmission mechanism section 27 has a single planetary gear 32. The sun gear S3 and a carrier CR3 of the planetary gear 32 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 is engaged with a counter driven gear 33, which is an input member of the under drive mechanism 27 and engages the counter drive gear 2. The carrier CR3 is linked to the counter shaft 22. A reduction gear 35 which is an output member of the automatic transmission mechanism section 27 is secured to the counter shaft 22.

The front differential device 29 comprises a differential carrier 36 and a pair of left and right side gears 37a, 37b. A ring gear 39 is secured to a gear mounting casing which forms the differential carrier 36. The ring gear 39 engages the reduction gear 35 to form the configuration of the final speed reduction mechanism. The left and right gears 37a, 37b are linked to the left and right front axle shafts 23a, 23b respectively.

The operation of the automatic transmission A will now be explained with reference to FIG. 3.

The rotation of the engine crank shaft 7 is transmitted to the input shaft 10 through the torque converter 9 or the lockup clutch 25. In the first speed status in the D range, the first clutch C1 is placed in an engaged state, and the fourth brake B4 is in a stopped state. In this status, in the first automatic transmission mechanism section 11, the rotation of the input shaft 10 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier gear CR1 is caused to rotate at a greatly reduced speed in the forward direction, and rotation is produced through the counter drive gear 2. In the second automatic transmission mechanism section 27, the sun gear S3 is stopped by means of the fourth brake B4 and the third one-way clutch F3, so that the rotation from the counterdriven gear 33 is produced as a reduced speed rotation in the carrier CR3 from the ring gear R3. Accordingly, the first speed rotation of the first automatic transmission mechanism section 11 and the reduced speed rotation of the second automatic transmission mechanism section 27 are combined, and the rotation is transmitted to the front differential device 29 through the reduction gear 35 and the ring gear 39, and is then transmitted to the left and right front axle shafts 23a, 23b.

In the second speed status in the D range, the second brake B2 is activated in addition to the connection of the clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 10, while the ring gear R2 of the dual planetary gear 31 is being idled in the forward direction, the carrier CR1 rotates with reduced speed in the forward direction, and the rotation is produced as the second speed in the counter drive gear 2. The second automatic transmission mechanism section 27 remains unchanged at reduced speed. The second speed of the first automatic transmission mechanism section 11 is combined with the reduced rotation of the second automatic transmission mechanism section 27, and the resulting rotation is transmitted to the front axle shafts 23a, 23b.

Incidentally, the first brake B1 also operates, and a larage transmission torque reaction upon upshifting is dispersed into and supported by the first and second brakes B1 and B2, and engine braking is acted upon at coasting.

In the third-speed status in the D range, the first automatic transmission mechanism section 11 maintains the second-speed status without change, and when the fourth brake B4 in the second automatic transmission mechanism section 27 is released, the third clutch C3 is placed in engagement. Whereupon the carrier CR3 and the sun gear S3 become connected to each other, and the planetary gear 32 rotates integrally to produce direct rotation in the counter shaft 22. At this time, the fourth brake B4 is released a little before the engagement of the third clutch C3, and shifting is made by the third one-way clutch F3 preventing transmission from becoming impossible. Accordingly, the second-speed rotation of the first automatic transmission mechanism section 11 and the direct rotation of the second automatic transmission mechanism section 27 are combined, and the third speed is obtained as a whole in the automatic transmission A.

The fourth speed status in the D range is obtained from the third-speed status with the second clutch C2 placed in engagement. Whereupon, rotation is transmitted to the ring gear R1 through the first clutch C1 from the input shaft 10, and to the sun gear S1 through the second clutch C2. The planetary gear unit 12 rotates integrally, and rotation is directly transmitted to the counter drive gear 2. Then, the directly connected rotation of the first automatic transmission mechanism section 11 and the directly connected rotation of the second automatic transmission mechanism section 27 are combined. In addition, the counter drive gear 2 and the driven gear 33 are in a prescribed acceleration relationship, so that the entire automatic transmission A is subjected to overdrive rotation. As this time, in case the first brake B1 is activated in the second and third speeds, when an upshift is made to the fourth speed, the first brake B1 is released a little ahead of time, so that while the sun gear S1 is being stopped by the one-way clutch F1, the second clutch C2 is engaged, and shift shock caused by gear change is prevented.

In addition, the third range is the same as the status where the first brake B1 is activated during the applciation of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped when engaged by the second one-way clutch F2, and the third brake B3 is stopped regardless the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 10 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is taken at the counter drive gear 2. Further, the speed of the reverse rotation of the counter drive gear 2 is reduced by the second automatic transmission mechanism section 27 and is transmitted to the front axle shaft 23a and 23b.

Figure 5:
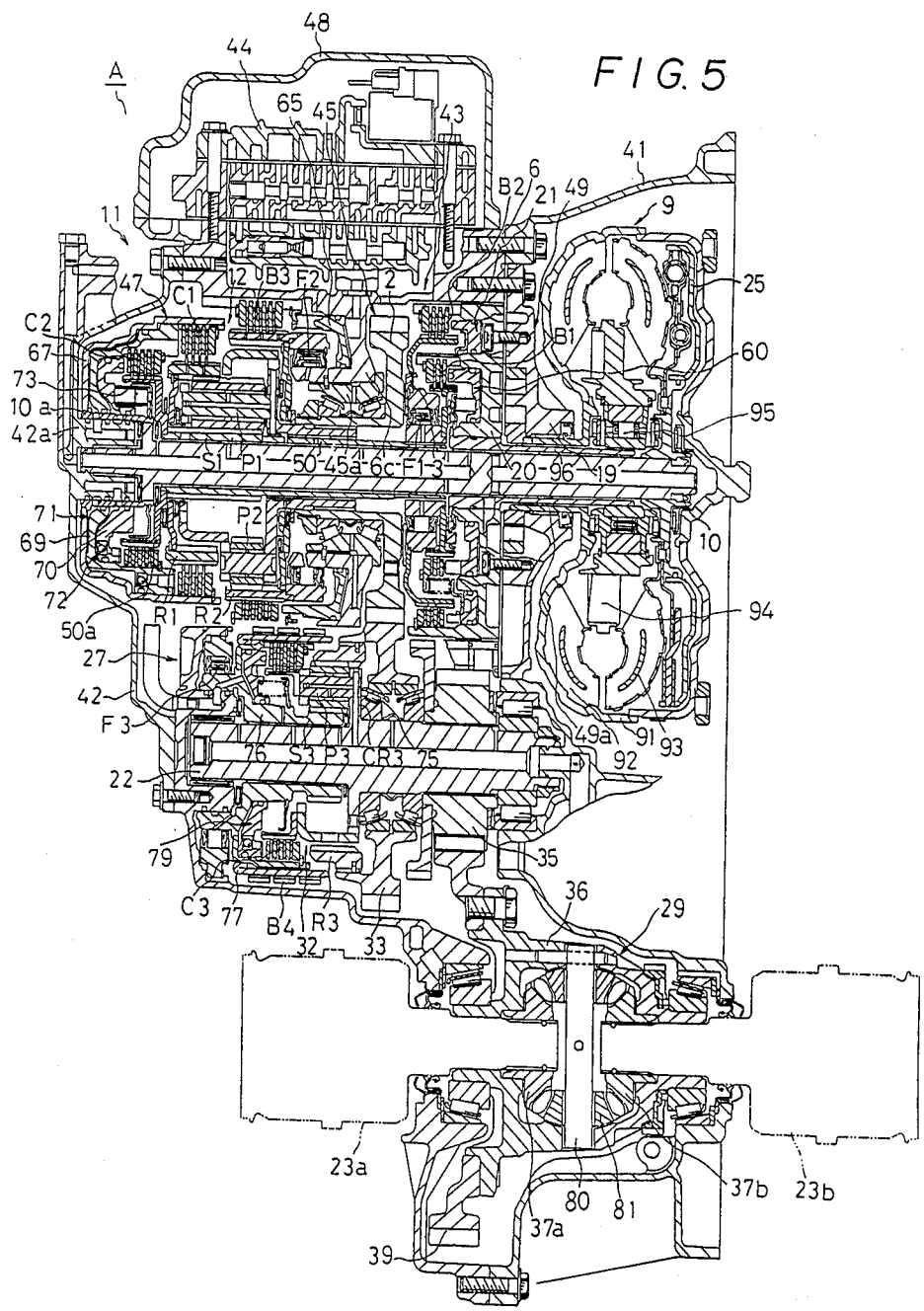
FIG. 5 is a cross sectional view of the general structure of the automatic transmission of FIG. 3.

Next, an explanation relative the automatic transmission A by means of a specific embodiment is made with reference to FIG. 5.

The automatic transmission A has an integral casing apparatus comprising a transaxle casing 6, a transaxle housing 41, and a rear cover 42. The input shaft 10, the counter shaft 22, and the ring gear mounting casing 36 which is a differential carrier of the front differential device 29 are free rotationally in the casing apparatus. Then, the torque converter 9 which has a lockup clutch 25, and the first automatic transmission mechanism section 11 are positioned on the input shaft 10. The second automatic transmission mechanism section 27 is positioned on the counter shaft 22. In addition, a valve body 44 is positioned on the transaxle casing 6.

In the first automatic transmission mechanism section 11, a brake section 43, an output section 45, the planetary gear unit 12, and a clutch section 47 are arranged in order in the axial direction from the engine crank shaft 7 to the rear. An oil pump 49 is positioned between the brake 43 and the torque converter 9. A hollow shaft 50 covers over and is free rotationally supported by the input shaft 10.

The planetary gear unit 12 comprises the single planetary gear 30 and the dual planetary gear 31, as shown in FIG. 3. The single planetary gear 30 comprises the sun gear S1 formed on the hollow shaft 50, the ring gear R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 to engage with each other, wherein the first pinion P1 is engaged with the sun gear S1, and the second pinion P2 is engaged with the ring gear R2. Both the planetary gears 30, 31 have a common single gear with the same number of teeth, that is the sun gear S1 on the hollow shaft 50. The carrier CR1 is integrally formed and the pinion P1 is formed from an integral long pinion.

Figure 1:
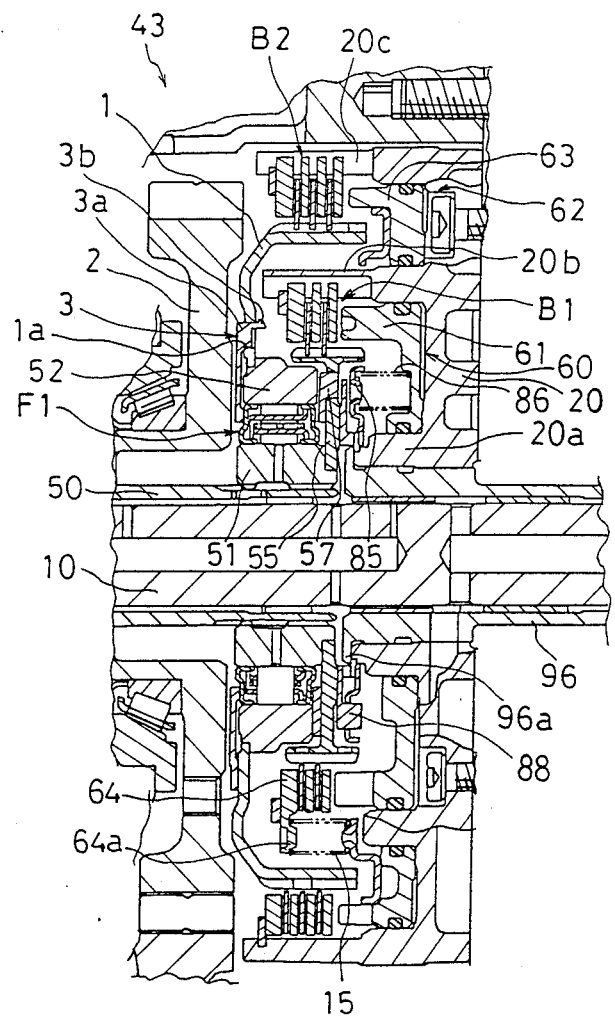
FIG. 1 is a cross-sectional view showing the thrust washer mounting apparatus of the present invention.

As shown in detail in FIG. 1, the first one-way clutch F1, the first brake B1 comprising a multiplate brake and the second brake B2 comprising a multiplate brake are arranged in the brake section 43 in order from the radially inner side to the radially outer direction. In the first one-way clutch F1, the tip of the hollow shaft 50 is engaged through a spline with an inner race 51, and a radially outwardly projecting hub 1 for the second brake is secured to the outer race 52. In addition, a hub 55 for the first brake is secured on the front side (engine side) of the inner race 51 of the one-way clutch F1. A ring-shaped thrust washer 3 with a claw section 3b is mounted on the hub 1 for the second brake B2 with the claw section engaged with an opening in the hub 1.

Figure 2:
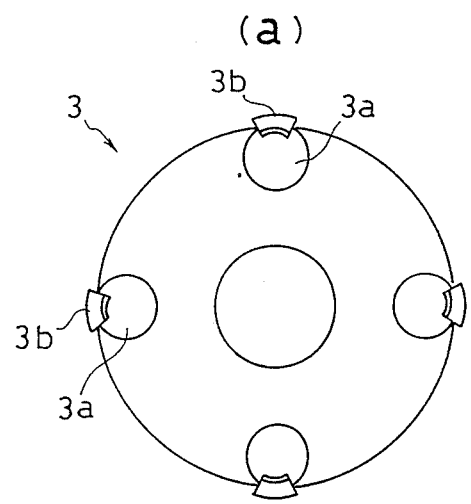
FIG. 2(a) is a front elevational view of the thrust washer of FIG. 1.
FIG. 2(b) is a central cross sectional view of the thrust washer of FIG. 1.
Figure 2:
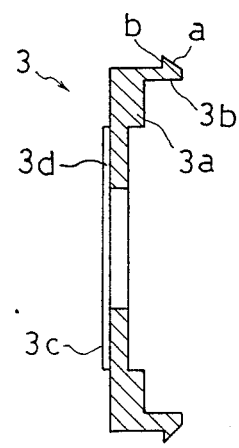

Also, a ring-shaped thrust washer 57 is mounted on the hub 55 for the first brake. The one-way clutch F1 is interposed between and retained by the thrust washers 3, 57. The thrust washer 3 mounted to the hub 1 for the second brake is, as shown in FIG. 2 (a), (b) formed with a certain number (for example four or three) of cylindrical protrusions 3a which axially project in one direction. In addition, a pawl 3b of a sector shape projects in the same direction from the outer peripheral portion of the protrusions 3a. The pawl 3b has a resilient property on the basis of the material of the thrust washer 3, and its tip portion has a tapered front surface a and an upstanding rear surface, which is of an arrowhead shape. In addition, the thrust surface 3c of the thrust washer is formed with a groove 3d to keep lubricant therein. Also, the hub 1 for the brake is formed with a certain number of circular through holes 1a, into which the protrusion 3a is fitted. In addition, the pawl 3b extends through and is stopped by the through holes 1a. Thus, the thrust washer 3 is mounted. Incidentally, the thrust washer 57 of the hub for the first brake is formed simply with a cylindrical protrusion which is fitted into the circular through hole of the hub 55.

The oil pump assembly comprises an oil pump 49, a pump cover 20 made from an aluminum die casting, a pump plate inserted into the pump body 19, and a bolt 59 which integrally secures the assembly. The cover 20 is inserted into the transaxle casing 6 and fixed by bolt. On the rear side of the oil pump cover 20, a boss section 20a, a first collar section 20b, and a second collar section 20c are formed radially outwardly from inside, and protrude in the axial direction. The first brake B1 is interposed between a comb-tooth shaped section of the first collar section 20b and the hub 55 for the first brake. Similarly, the second brake B2 is interposed between a comb-tooth shaped section of the second collar section 20c and the hub 1 for the second brake. In addition, a cylinder of the ring-shaped hydraulic actuator 60 for the first brake is formed between the boss section 20a and the first collar section 20b. A piston 61 is oil-sealingly fitted into this cylinder, and a lug section of the piston 61 is extended in the axial direction to contact and activate the first brake B1. Also, a cyclinder of the ring-shaped hydraulic actuator 62 used for the second brake is formed between the first collar section 20b and the second collar section 20c. A piston 63 is oil-sealingly fitted into this cylinder, and a lug section of the piston 63 is extended in the axial direction to contact and activate the second brake B2. In addition, the end plate 64 of the first brake engaged with the first coller 20b by means of a snap ring partly projects from the radially outward side to be a spring receiving section 64a. Further, a return spring 15 for the hydraulic actuator 62 for the second brake 2 is interposed between the receiving section and the lug positioned behind the piston 63.

The torque converter 9 is provided with a converter housing 91 linked to the engine crank shaft 7 (FIG. 3), and further with a pump impeller 92 and a lockup clutch 25 connected to the housing 91, a turbine runner 93 connected to the input shaft 10, and a stator 94 positioned between the two impellers 92, 93. A pump sleeve 49a is secured to the base of the tip of the converter housing 91. The sleeve 49a extends into the pump body 19 and has its tip secured to a pump drive gear 49b. The stator 94 is secured to the outer race of the one-way clutch 95. In addition, the inner race of the one-way clutch 95 is engaged through a spline to the stator shaft 96. The stator shaft 96 is a hollow shaft fabricated from steel. The pump sleeve 49a is positioned on the outer circumference side of the stator shaft 96, and the input shaft 10 is positioned on the inner circumference side to form a relatively freely rotatable triple shaft. One end of the stator shaft 96 forms a spline section which engages the inner race of the one-way clutch 95. The other end of the stator shaft 96 is bulged in a radially outward direction to form a thickened section. The thickened section is secured by being pressed into the center hole section of the pump cover 20. Formed in this end of the stator shaft 96 is an annular flange section 96a which projects even further in the outward radial direction from the thickened section for a comparatively short distance.

The inside of the flange section 96a is engaged in intimate contact with the outside surface of the pump cover 20. A snap ring groove is defined by the flange section 96a and the annular recessed section of the corner section of the pump cover 20. The spring receiving member 85 and the snap ring are installed in the snap ring groove. The snap ring supports the receiving member 85 to prevent it from being ejected. The return spring 86 is fitted by compression between the receiving member 85 and the rear surface of the piston 61 of the first hydraulic actuator 60. Mounted on the receiving member 85 with respect to the hub 55 is a thrust washer 88 which has a cylindrical protrusion.

The output section 45 is positioned at almost dead center of the first automatic transmission mechanism section 11. The counter drive gear 2 is free rotationally supported on the bulkhead 6c formed in the transaxle casing 6 through a double tapered bearing 45a. The counter drive gear 5 has a boss section which is connected to the carrier CR1 of the planetary gear unit 2. An outer race of the bearing 45a is engaged by a spline to the inner peripheral surface of the casing bulkhead 6c, and the second one-way clutch F2 is mounted on the outer peripheral surface of the race extension section.

An outer race of the second one-way clutch F2 is secured to the ring gear R2 of the dual planentary gear 31, and the ring gear R2 is supported in the axial direction by a support plate which is interposed between a counter gear boss section and the carrier CR1 through a thrust bearing. Accordingly, the second one-way gear F2 is juxtaposed in the axial direction between the planetary gear unit 3 and the casing bulkhead 6c. In addition, the third brake B3 is interposeed between the outer periphery of the ring gear R2 and the axle casing 6, and a cylinder is formed on one side of the surface section of the bulkhead 6c. In addition, the hydraulic actuator 65 formed from a piston is interposedly positioned between the one-way clutch F2 and the cylinder. Further, the hydraulic actuator 65 is provided with a cylindrical, comb-tooth shaped arm. This arm extends in the axial direction through the radially outer side of the second one-way clutch F2, so that a return spring is arranged in the combtooth section and the third brake B3 is controlled.

The clutch section 47 is provided with the first (forward) clutch C1 and the second (direct) clutch C2 and is positioned at the rear edge of the first automatic transmission mechanism section 11 and housed in the rear cover 42. In addition, the rear edge section of the input shaft 10 forms the sleeve section 3a by which the boss section 42a of the cover 42 is engaged. In addition, a clutch drum 67 is integrally linked to the sleeve section 3a. A movable member 69 is engaged to freely slide only in the axial direction on the clutch drum 67 by means of a spline. A piston member 70 is fitted with the movable member 69. In addition, the movable member 69 defines an oil chamber cooperating with a cylinder which is formed from the inner peripheral surface of the clutch drum 67, thereby forming a hydraulic actuator 71 for use with the first clutch C1. A piston member 70 defines an oil chamber cooperating with a cylinder formed from the inner peripheral surface of the movable member 69, thereby forming a hydraulic actuator 72 for use with the second clutch C2. Set between the piston member 70 and the snap ring secured to the sleeve 10a is a spring 73 which is compressed through a receiving member. The spring 73 forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the outer peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 50.

The second automatic transmission mechanism section 27 is provided with one single planetary gear 32. Also, the counter driven gear 33 is free rotationally supported on the counter shaft 22 through a bearing 75, and the reduction gear 35 is secured to the counter shaft 22. The ring gear R3 of the planetary gear 32 is linked to the counterdriven gear 33. The carrier CR3 which supports the pinion P3 is integrally formed by with the counted shaft 22 to extend in the radially outer direction of the counter shaft 22. The sun gear S3 is formed on a hub 76 which is free rotationally supported on the shaft 22. A drum 77 secured to the radially outer section of the hub is engaged on its outer peripheral surface by the fourth brake B4 which is a hand brake. The third clutch C3 is interposed between the inner peripheral surface of the drum 77 and the hub secured to the carrier CR3. A piston engages the hub 76 adjacent to the clutch C3 and forms a hydraulic actuator for the clutch C3. The third one-way clutch F3 is interposed between the elongated section of the hub 76 and the casing 6.

The front differential device 29 is provided with the ring gear mounting casing 36 which forms a differential carrier. The casing 36 is free rotationally supported on the housing 41 and casing 6 through a bearing. The large diameter ring gear 39 which engages the reducing gear 35 is secured to the mounting casing 36. In its inner section, a pinion gear 81 is free rotationally supported by a pinion shaft 80, and the right and left side gears 37a, 37b which engage the gear 81 are free rotationally supported. A pair of right and left front axle shafts 23a, 23b are respectively engaged and linked by the side gears 37a, 37b.

Next, the assembling of the autoamtic transmission A will be explained.

First, the tapered roller bearing 45a is mounted to the counter drive gear 2 to make a subassembly, which is mounted to the bulk head 6c of the casing 6.

The piston of the hydraulic actuator 65 for the third brake B3 is mounted and the ring gear R2 is mounted together with the second one-way clutch F2. Then a support plate is inserted to support the ring gear R2, and the carrier CR1 is assembled with the pinions P1, P2 supported. Further, the ring gear R1 is installed and the hollow shaft 50 is inserted, thereby assembling the planetary gear unit 12.

The movable section 69, the piston member 70 and the return spring 73 are mounted to the clutch drum 67, and the second clutch C2 and the first clutch C1 are installed to make the clutch section 47 a subassembly for mounting with the input shaft 10.

On the other hand, the thrust washer 3 is mounted to the hub 1 for the brake secured to the outer race 52 of the first one-way clutch F1. Specifically, by forcing the thrust washer 3 into the hub 1 with the protrusion 3a of the thrust washer 3 in alignment with the through hole 1a of the hub 1, the pawl 3b is bent on the basis of the tapered surface a and inserted into the through hole 1a. Then the pawl 3b is resiliently restored and the pawl 3b is clicked into engagement with the side surface of the hub 1 when the upstanding surface of the pawl 3b leaves from the through hole 1a. The hub 55 for the first brake is affixed to the front side of the one-way clutch F1 through the thrust washer 57 to make a subassembly of the one-way clutch.

On the other hand, the pump cover 20 is mounted to the pump body 19, and the hydraulic actuator 60, the hydraulic actuator 62 for the second brake and the stator shaft 96 are mounted to the cover 20. Further, the first brake B1 and the second brake B2 are installed to make a subassembly, which is combined with the subassembly of the one-way clutch F1. Then the resulting subassembly is inserted into the input shaft 10 and secured to the casing 6 with bolts, whereby the counter drive gear 2, the one-way clutch F1, the hub 55 for the first brake and the return spring receiving member 85 of the actuator 60 for the first brake are axially tightly arranged and positioned in the brake section 43 with the thrust washers 3, 57, 86 between the members to absorb the relative rotations therebetween.

The second automatic transmission 27, the counter driven gear 33 and the reduction gear 35 are installed on the counter shaft 22 to form a subassembly, and the front differential device 29 is assembled to provide a subassembly. Then the transaxle housing 41 and the rear cover 42 are connected and secured to the joint sections of the transaxle casing 6 to support the subassemblies in the aurtomatic transmission mechanism section 11 together with the first automatic transmission mechanism section 11. Finally the torque converter 9 is installed for completing the automatic transmission A.

In the abovementioned embodiment of the present invention, the explanation was given to the automatic transmission A comprising the first automatic transmission mechanism section 1 with the three forward speeds and the second automatic transmission mechanism section 27 with the direct speed and reduced speed switching. However, this is not restrictive to the present invention. As revealed in Japanese Laid Open Patent Publication No. SHO-62-141342, an automatic transmission using four forward speeds of an automatic transmission mechanism section, or other automatic transmissions can, of course, be applied.

TECHNICAL ADVANTAGES OF THE INVENTION

As mentioned above, in the present invention, since the thrust washer (3) is securely mounted to the rotating member (1) with the pawl (3b), upon assembling the automatic transmission (A), the washer (3) is positively prevented from dropping and misalignment.

Also, even when a clearance is produced between the washer (3) and the rotating member (2) in driving the automatic transmission (A), the washer (3) is positively prevented from dropping and misalignment.

In addition, When assembling the trust washer (3) to the rotating member (1), all what is to do is lightly forcing the washer (3) to the rotating member (1), so that the assembling is very easy, and the sound and feeling of clicking are availabel when the pawl (3b) is engaged, which will provide positive and precise mounting.

Even if the thrust washer has some waves, due to the pawl (3b), the positive mounting is possible, so that the deviated contact of the wave portions and the local abrasion are prevented.

What is claimed is:

1. A thrust washer mounting apparatus for an automatic transmission, comprising:
    a thrust washer having a side surface, a plurality of protrusions formed on the side surface to project parallel to an axial direction thereof, and at least one projecting pawl formed on at least one of the protrusions to further project outwardly from the protrusion, said projecting pawl having a front tapered surface and an upstanding rear surface, and
    at least one rotating member having a plurality of through holes corresponding to the protrusions, said protrusions, when inserted into the through holes, passing through the through holes so that the upstanding rear surface of the projecting pawl prevents the protrusions from disengaging from the through holes to thereby directly transfer rotational force of the rotating member to the thrust washer through the protrusions, said pawl so dimensioned to permit a degree of an axial movement between said thrust washer and said rotating member while maintaining engagement between said protrusions and said holes.

2. A thrust washer mounting apparatus according to claim 1, wherein said automatic transmission comprises a torque converter, a pump cover placed adjacent to the torque converter, a counterdrive gear situated in a mid portion of the automatic transmission, and a brake section situated between the counterdrive gear and the pump cover, said brake section including a one-way clutch, a first brake and a second brake with a hub arranged in order from inside to radially outwardly thereof, said one-way clutch having an outer race fixed to the hub of the second brake, said hub having the through holes for the thrust washer.

3. A thrust washer mounting apparatus according to claim 1, wherein said projecting pawl is curved along the protrusion, and said thrust washer further includes a groove at a side opposite to the protrusions to keep lubricant therein.

4. A thrust washer mounting apparatus for an automatic transmission, comprising:
    a thrust washer having a side surface, and a plurality of protrusions formed on the side surface to extend parallel to an axial direction thereof and arranged symmetrically relative to a center of the thrust washer, each protrusion including a projecting pawl at a side away from the center of the thrust washer and having a front tapered surface facing radially outwardly and inclining forwardly of the thrust washer, said projecting pawl being curved along the protrusion, and an upstanding rear surface, said thrust washer further including a thrust surface formed at a side opposite to the protrusions and having a groove to keep lubricant therein, and at least one rotating member having a plurality of through holes corresponding to the protrusions, said protrusions, when inserted into the through holes, bending along the through holes by means of the front tapered surfaces, passing through the through holes and returning to the original posture so that the upstanding rear surfaces engage the rotating member and prevent the thrust washer from disengaging from the through holes.

* * * * *